United States Patent
Choi et al.

(10) Patent No.: US 7,643,121 B2
(45) Date of Patent: *Jan. 5, 2010

(54) LIQUID CRYSTAL DISPLAY OF LINE-ON-GLASS TYPE

(75) Inventors: Seung Kyu Choi, Daegu (KR); Kwang Soon Park, Daegu (KR); Chul Woo Im, Kumi-shi (KR); Sang Moo Song, Daegu (KR); Choel Min Woo, Sangju-shi (KR)

(73) Assignee: LG Display Co., Ltd., Seoul (KR)

( * ) Notice: Subject to any disclaimer, the term of this patent is extended or adjusted under 35 U.S.C. 154(b) by 7 days.

This patent is subject to a terminal disclaimer.

(21) Appl. No.: 10/326,078

(22) Filed: Dec. 23, 2002

(65) Prior Publication Data

US 2003/0189685 A1    Oct. 9, 2003

(30) Foreign Application Priority Data

Apr. 8, 2002    (KR) .................. 10-2002-0018894

(51) Int. Cl.
*G02F 1/1345* (2006.01)
(52) U.S. Cl. ................... 349/149; 349/150
(58) Field of Classification Search ............. 349/42–43, 349/53–55, 149–152
See application file for complete search history.

(56) References Cited

U.S. PATENT DOCUMENTS

| | | | |
|---|---|---|---|
| 5,504,348 A | * | 4/1996 | Yoshida et al. .............. 257/59 |
| 5,909,035 A | * | 6/1999 | Kim ........................... 257/59 |
| 5,973,658 A | * | 10/1999 | Kim et al. .................... 345/92 |
| 6,292,163 B1 | * | 9/2001 | Nam et al. .................. 345/100 |
| 6,388,719 B1 | * | 5/2002 | Matsunaga et al. ........... 349/40 |
| 6,842,203 B2 | * | 1/2005 | Choi et al. ................... 349/46 |
| 7,349,037 B2 | * | 3/2008 | Na et al. ..................... 349/40 |

FOREIGN PATENT DOCUMENTS

JP    01-197722    * 8/1989

* cited by examiner

*Primary Examiner*—Dung T. Nguyen
(74) *Attorney, Agent, or Firm*—McKenna Long & Aldridge

(57) ABSTRACT

A line-on-glass (LOG) type liquid crystal display device prevents deterioration in picture quality due to line resistances in LOG signal lines includes a display area having liquid crystal cells arranged at crossings of gate and data lines, a storage capacitor arranged within each of the liquid crystal cells for maintaining charged pixel voltages, and a dummy gate line. A line-on-glass type signal line group outside the display area transmits driving signals to the gate driver integrated circuits for driving the gate lines. A first signal line outside the display area is mounted on gate tape carrier packages. A second signal line connects the first gate low voltage and dummy lines, is insulated from, and crosses the gate lines outside the display area. A third signal line connects the first gate low voltage line and the dummy gate line to connect the first and second gate low voltage lines in parallel.

8 Claims, 5 Drawing Sheets

LIQUID CRYSTAL DISPLAY OF LINE-ON-GLASS TYPE

This application claims the benefit of Korean Patent Application No. 2002-18894, filed on Apr. 8, 2002, which is hereby incorporated by reference for all purposes as if fully set forth herein.

BACKGROUND OF THE INVENTION

1. Field of the Invention

The present invention relates to liquid crystal displays, and more particularly to line-on-glass (LOG) type liquid crystal displays that are capable of preventing deterioration in picture quality caused by a line resistance of LOG gate low voltage lines arranged on a liquid crystal display panel.

2. Discussion of the Related Art

Generally, liquid crystal displays (LCDs) use electric fields to control light transmittance characteristics of a layer of liquid crystal material. Accordingly, LCDs typically include a liquid crystal display panel having a plurality of liquid crystal cells arranged in a matrix pattern and a driver circuit for driving the plurality of liquid crystal cells to display a picture on the liquid crystal display panel.

The plurality of liquid crystal cells are arranged on the liquid crystal display panel at locations where gate lines cross data lines. Electric fields may be applied to the layer of liquid crystal material via pixel and common electrodes arranged on the liquid crystal display panel. Each pixel electrode is connected to a data line via source and drain electrodes of switching devices such as thin film transistors. Gate electrodes of each thin film transistor are connected to corresponding gate lines and allow pixel voltage signals to be selectively applied to corresponding pixel electrodes.

The driver circuit includes a gate driver for driving the gate lines, a data driver for driving the data lines, a timing controller for controlling the gate and data drivers, and a power supply for supplying driving voltages used in driving the LCD. The timing controller controls the gate and data drivers by controlling a driving timing of the gate and data drivers and by applying pixel data signals to the data driver. Driving voltages generated by the power supply include common (Vcom), gate high (Vgh), gate low (Vgl) voltages, etc. The gate driver sequentially applies scanning signals to the gate lines to sequentially drive the liquid crystal cells within the liquid crystal display panel one gate line at a time. The data driver applies data voltage signals to each of the data lines whenever a gate line is in receipt of a gate signal. Accordingly, LCDs control light transmittance characteristics of liquid crystal material using electric fields applied between pixel and common electrodes in accordance with pixel voltage signals specific to a liquid crystal cell.

Data and gate drivers are directly connected to the liquid crystal display panel and are provided as a plurality of integrated circuits (ICs). Each of the gate driver ICs and data driver ICs are mounted to the liquid crystal display panel using tape carrier package (TCP) or chip on glass (COG) techniques. Further TCP-type gate and data driver ICs are connected to the liquid crystal display panel via a tape automated bonding (TAB) technique.

TCP-type gate and data driver ICs, connected to the liquid crystal display panel by the TAB technique, receive control signals and direct current (DC) voltage signals transmitted over signal lines provided on a printed circuit board (PCB). For example, each of the data driver ICs are connected to each other in series via signal lines mounted on a data PCB, receive control signals from the timing controller, and receive pixel data signals and driving voltages from the power supply. Gate driver ICs are connected to each other in series, via signal lines mounted on a gate PCB, receive control signals from the timing controller, and receive driving voltages from the power supply.

COG-type gate and data driver ICs are connected to each other via signal lines formed using a line-on-glass (LOG) technique. Mounted on a lower glass substrate of the liquid crystal display panel, the signal lines formed using the LOG technique receive control signals from the timing controller and power supply and driving voltages from the power supply.

Even when the various driver ICs are connected to liquid crystal display panels via the TAB technique, the LOG technique is typically adopted to eliminate the PCB and provide a thinner overall liquid crystal display. For example, signal lines connecting the gate driver ICs are relatively small and are provided directly on the liquid crystal display panel. Accordingly, gate driver ICs are connected to the liquid crystal display via the TAB technique, are connected to each other in series via signal lines mounted on a lower glass substrate of the liquid crystal display panel, and receive control and driving voltage signals (i.e., gate driving signals).

Figure 1:
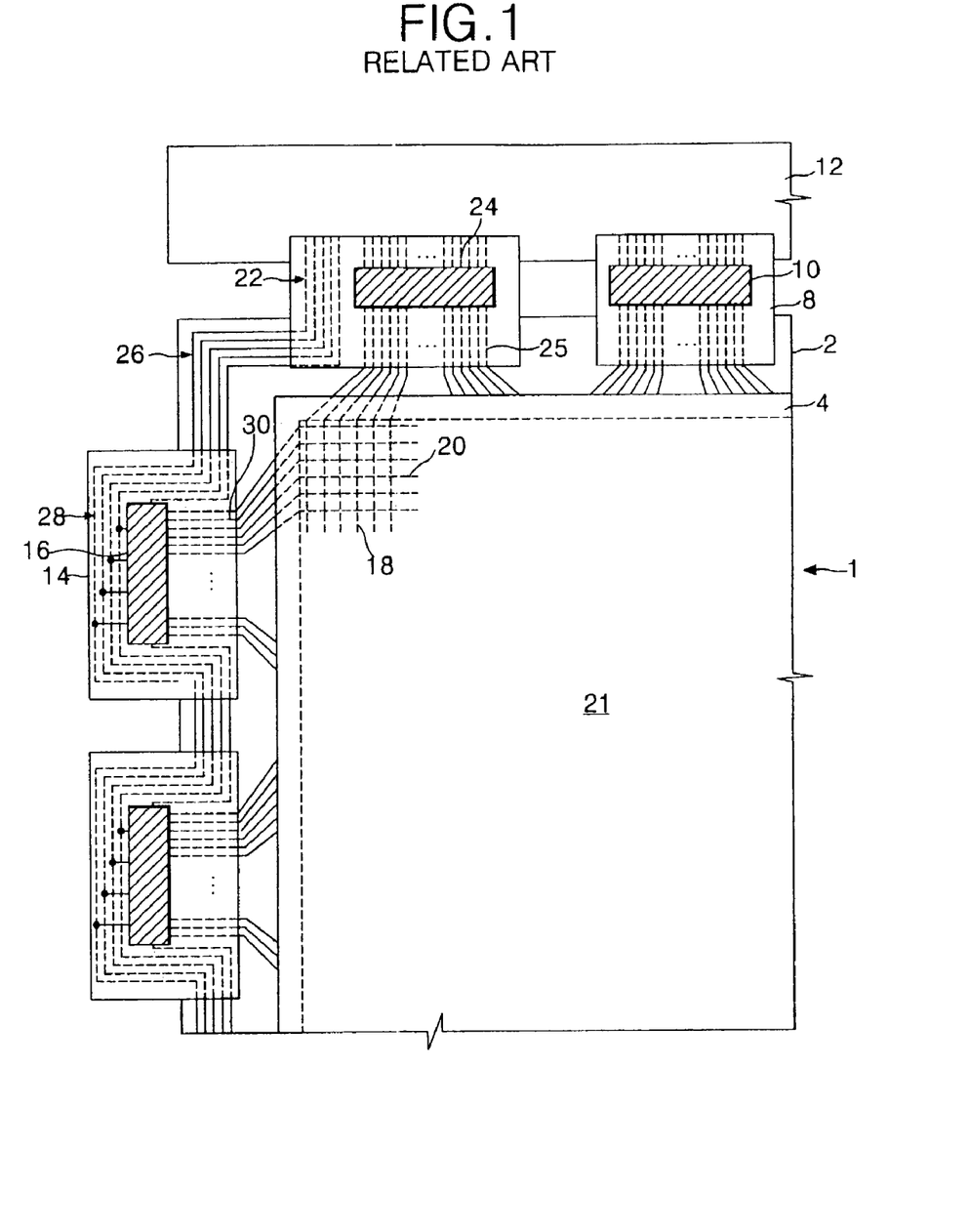
FIG. 1 illustrates a schematic view of a line-on-glass type liquid crystal display.

Referring to FIG. 1, liquid crystal displays including LOG signal lines (e.g., formed without the gate PCB) typically include a liquid crystal display panel 1, a plurality of data TCPs 8 connected between a first side of the liquid crystal display panel 1 and a data PCB 12, a plurality of gate TCPs connected to a second side of the liquid crystal display panel 1, data driver ICs 10 mounted on the data TCPs 8, and gate driver ICs 16 mounted on the gate TCPs 14.

The liquid crystal display panel 1 includes a lower substrate 2 supporting signal lines and a thin film transistor array, an upper substrate 4 supporting a color filter array, and a layer liquid crystal material injected between the lower and upper substrates 2 and 4, respectively. The liquid crystal display panel 1 further includes a picture display area 21 having liquid crystal cells arranged where gate lines 20 and data lines 18 cross each other. The data driver ICs 10 convert digital pixel data signals into analog pixel voltage signals and apply the analog pixel voltage signals to the data lines 18.

Data pads and gate pads (not shown) are arranged at respective ends of the data and gate lines 18 and 20 at an outer portion of the lower substrate 2, outside the picture display area 21. An LOG signal line group 26 is positioned within the outer area and transmits gate driving signals to the gate driver ICs 16.

Data TCPs 8 include input pads 24 and output pads 25 for electrically connecting the data driver IC 10 mounted thereon to the data PCB 12 and the data lines 18. The input pads 24 of the data TCP 8 are electrically connected to the output pads of the data PCB 12 while the output pads 25 of the data TCP 8 are electrically connected to the data pads arranged on the lower substrate 2. A first data TCP 8 is further provided with a gate driving signal transmission group 22. The gate driving signal transmission group 22 electrically connects the LOG signal line group 26 to the timing controller and power supply via the data PCB 12.

Each of the gate TCPs 14 includes a gate driving signal transmission line group 28 and output pads 30 electrically connecting the gate driver ICs 16 mounted thereon to the LOG signal line group 26 and the gate lines 20, respectively. Accordingly, the output pads 30 are electrically connected to the gate pads arranged on the lower substrate 2.

Each gate driver IC 16 sequentially applies a scanning signal (e.g., a gate high voltage signal (Vgh)) to each of the gate lines 20 in response to inputted control signals. Further, the gate driver ICs 16 apply a gate low voltage signal (Vgl) to each of the gate lines 20 not in receipt of the gate high voltage signal (Vgh).

The LOG signal line group 26 typically consists of signal transmission lines and transmits direct current (DC) voltage signals (e.g., gate high voltage (Vgh), gate low voltage (Vgl), common voltage (Vcom), ground voltage (GND), supply voltage (Vcc) signals, etc.) and gate control signals (e.g., gate start pulse (GSP), gate shift clock (GSC), gate enable (GOE) signals, etc.).

Individual signal transmission lines within the LOG signal line group 26 are arranged in a fine parallel pattern and are provided within a narrow space, similar to a space where signal lines in gate and data pads are positioned at outer portions of the picture display area 21. Signal transmission lines within the LOG signal line group 26 are formed of same metal as the gate metal layer and are arranged on the lower substrate 2. Gate insulating and protective films 34 and 36, respectively, are disposed over the LOG signal line group 26. Being formed from the same material as the gate metal, signal transmission lines within the LOG signal line group 26 typically have a resistivity of 0.046 and are formed simultaneously with the gate lines 20. Thus, the LOG signal line group 26 has a larger resistance than signal lines, typically made of a material such as copper, formed in the gate PCB. As resistance values of signal transmission lines within the LOG signal line group 26 are proportional to their lengths, the resistance of signal transmission lines increases as the distance from the data PCB 12 increases. Accordingly, gate driving signals, transmitted via the LOG signal line group 26, become attenuated, their voltage values become distorted, and the quality of pictures capable of being displayed on the liquid crystal display becomes deteriorated.

For example, distortion of the gate low voltage signal (Vgl) transmitted through the LOG signal line group 26 affects the picture quality displayed within the picture display area 21. Gate low voltage signals (Vgl) maintain the pixel voltage charged within the liquid crystal cell between intervals when the gate high voltage (Vgh) is charged within the pixel. Accordingly, as the gate low voltage signal is distorted, the pixel voltage within the liquid crystal cell also becomes distorted.

LOG gate low voltage transmission lines, arranged within the LOG signal line group 26, supply the gate low voltage (Vgl) and include a plurality of LOG gate low voltage transmission lines. The plurality of gate low voltage transmission lines electrically connect the first data TCP 8 and the plurality of gate TCPs 14, respectively. The plurality of gate low voltage transmission lines have intrinsic line resistance values proportional to their lengths, and are connected to each other in series via the plurality of gate TCPs 14. Thus, the brightness to which images may be expressed by liquid crystal cells connected to gate lines across the liquid crystal display panel becomes non-uniform. The non-uniform brightness across the liquid crystal display panel induces a cross-line phenomenon (32) that divides the screen in brightness values and thereby deteriorates the picture quality of the liquid crystal display.

Figure 2:
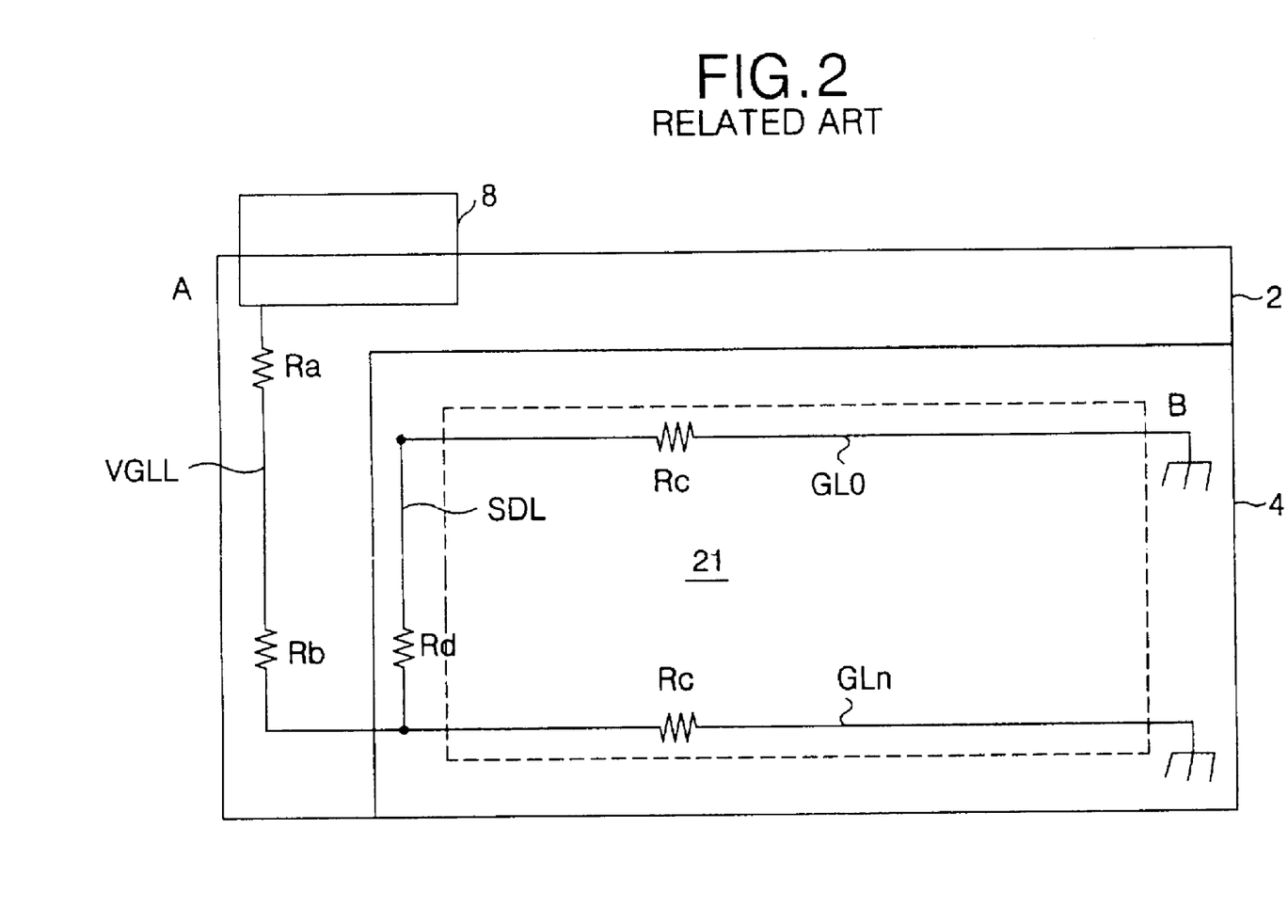
FIG. 2 illustrates a gate low voltage transmission line within the liquid crystal display panel shown in FIG. 1.

Referring to FIG. 2, the gate low voltage signal (Vgl) is applied to the entire liquid crystal display panel via a relatively long transmission path and a load at a gate low voltage output terminal of the data TCP 8 is increased.

Referring to FIG. 2, a gate low voltage signal (Vgl) transmission path formed on the lower substrate 2 may equivalently be expressed as A-B transmission path and an A-C transmission path. A gate low voltage signal (Vgl) is applied to a dummy gate line GL0 on the A-B transmission path.

Accordingly, the A-B transmission path typically includes a first gate low voltage line VGLL and a second gate low voltage line SDL arranged between the dummy gate line GL0 and the first gate low voltage line VGLL.

The first gate low voltage line VGLL may extend from the data TCP 8 to the lower end of the lower substrate 2 via the gate TCP (not shown). The second gate low voltage line SDL may extend from the first gate low voltage line VGLL at the lower end of the lower substrate 2 to the dummy gate line GL0 at the upper end of the lower substrate 2. The second gate low voltage line SDL crosses portions of the gate lines (not shown) arranged within a non-display area, outside the picture display area 21. Accordingly, the second gate low voltage line SDL may be formed from a source/drain metal layer and be insulated from the gate lines via a gate insulating film.

The first gate low voltage line VGLL has an intrinsic line resistance, Ra+Rb, which is determined by adding a first intrinsic line resistance, Ra, specific to the portion of the first gate low voltage line VGLL arranged between the data TCP 8 and a first gate TCP, and a second intrinsic line resistance, Rb, specific to the portion of the first gate low voltage line VGLL arranged between the gate TCPs. Similarly, the dummy gate line GL0 has a third intrinsic line resistance, Rc, and the second gate low voltage transmission line SDL has a fourth intrinsic line resistance, Rd. Thus, the total line resistance of the A-B transmission path is equal to the sum of the first to fourth line resistances, Ra+Rb+Rc+Rd.

The A-C transmission path supplies a gate low voltage signal (Vgl) to the nth gate line GLn via a corresponding gate driver IC (not shown). Accordingly, the A-C transmission path typically includes the first gate low voltage transmission line VGLL and the nth gate line GLn. The intrinsic line resistance of the nth gate line GLn is substantially equal to the third intrinsic line resistance, Rc, of the dummy gate line GL0. Thus, the total line resistance of the A-C transmission path is equal to the sum of the first to third line resistances, Ra+Rb+Rc.

The load present at the output terminal of the data TCP 8 is proportional to the total line resistance of the gate low voltage line at the output terminal of the data TCP 8. Accordingly, the total line resistance of the gate low voltage line at the output terminal of the data TCP 8 may be expressed as Ra+Rb+((Rc+Rd)/Rc). For example, assuming that Ra=15Ω, Rb=45Ω, Rc=3 kΩ and Rd=5 kΩ, the total line resistance of the A-B transmission path is 15Ω+45Ω+3 kΩ+5 kΩ=8.06 kΩ, the total line resistance of the A-C transmission path is 15Ω+45Ω+3 kΩ=3.06 kΩ, and the total line resistance of the first gate low voltage transmission line VGLL becomes 15Ω+45Ω+((3 kΩ+5 kΩ)/3 kΩ)≈3.24 kΩ.

In order to overcome the relatively large line resistance of the A-B transmission path, a relatively large load is provided at the gate low voltage output terminal of the data TCP 8. Such a large load further distorts the gate low voltage signals (Vgl) applied from the gate low voltage output terminal. Accordingly, unstable gate low voltage signals (Vgl) are applied to the gate lines within the picture display area 21 and further induce a deterioration in the picture quality. Further, differences in gate low voltage signals for each gate driver IC are enlarged due to the line resistance within of the gate low voltage line. Accordingly, the aforementioned cross-line phenomenon is magnified across the liquid crystal display.

The first gate low voltage line VGLL is typically positioned at the outermost portion of the lower substrate 2, is formed relatively shorter in length than other LOG signal lines, and is patterned to have a maximized line width within a confined space. As the first gate low voltage line VGLL is positioned at the outermost portion of the lower substrate 2, a gate low voltage signal (Vgl) applied to the dummy gate line GL0 passes the first gate low voltage line VGLL and the second gate low voltage line SDL. Since the A-B transmission path (VGLL+SDL) of the gate low voltage signal (Vgl) applied to the dummy gate line GL0 is longer than the A-C transmission path of the gate low voltage signal (Vgl) applied to another gate line (eg., GLn), the intrinsic line resistance of the A-B transmission path is larger than intrinsic line resistance of the A-C transmission path. Accordingly, a voltage associated with a gate low voltage signal (Vgl) applied to the dummy gate line GL0 is reduced compared to a voltage associated with the gate low voltage signal (Vgl) applied another gate line (e.g., GLn). Accordingly, capacitance values of storage capacitors Cst connected to the dummy gate line GL0 are reduced compared to capacitance values of storage capacitors Cst connected to another gate line (e.g., GLn) such that liquid crystal cells connected to the dummy gate line GL0 express images at a greater brightness than liquid crystal cells connected to another gate line (e.g., GLn).

SUMMARY OF THE INVENTION

Accordingly, the present invention is directed to a line-on-glass type liquid crystal display of that substantially obviates one or more of the problems due to limitations and disadvantages of the related art.

An advantage of the present invention provides a LOG liquid crystal display device wherein a load at a gate low voltage line may be reduced to minimize a distortion of gate low voltage signals applied.

Another advantage of the present invention provides a LOG liquid crystal display device wherein a potential of a dummy gate line is substantially equal to that of other gate line thereby preventing the cross-line phenomenon from being induced.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a line-on-glass liquid crystal display device may, for example, include a picture display area having a plurality of liquid crystal cells arranged at each crossings of gate lines and data lines, a storage capacitor arranged within each of the liquid crystal cells for maintaining a charged pixel voltage, wherein a storage capacitor is arranged within the liquid crystal cells connected to a dummy gate line (e.g., a first gate line), a line-on-glass signal line group provided at the outer region of the picture display area for transmitting driving signals required by the gate driver integrated circuits for driving the gate lines, wherein a first gate low voltage line included within the line-on-glass signal line group may apply a gate low voltage signal to the dummy gate line and may include a first gate low voltage line provided on a gate tape carrier package mounted with the gate drive integrated circuits, a second gate low voltage line included within the line-on-glass signal line group provided to cross and be insulated from the gate lines, wherein the second gate low voltage line is connected between the first gate low voltage line and the dummy gate line, and a third gate low voltage line included within the line-on-glass signal line group connected between the first gate low voltage line and the dummy gate line to thereby provide a parallel connection between the first and second gate low voltage lines.

In one aspect of the present invention, the second gate low voltage line may be formed from a source/drain metal layer insulated from the gate lines by a gate insulating film.

In another aspect of the present invention, a line-on-glass liquid crystal display device may, for example, include a picture display area having a plurality of liquid crystal cells arranged at each crossings of gate lines and data lines, a storage capacitor arranged within each of the liquid crystal cells for maintaining a charged pixel voltage, wherein a storage capacitor is arranged within the liquid crystal cells connected to a dummy gate line (e.g., a first gate line), a line-on-glass type signal line group provided at the outer region of the picture display area for transmitting driving signals required by the gate driver integrated circuits for driving the gate lines, a static electricity prevention circuit connected to the dummy gate line, other gate lines, and a common voltage supply line capable of supplying a common voltage at the outer region of the picture display area.

In yet another aspect of the present invention, a potential of the dummy gate line is substantially equal has an equal potential with respect to other gate lines.

In still another aspect of the present invention, a first gate low voltage line included within the line-on-glass gate signal line group may apply a gate low voltage signal to the dummy gate line and may include a first gate low voltage line provided on a gate tape carrier package mounted with the gate drive integrated circuits at the outer region of the picture display area, a second gate low voltage line included within the line-on-glass signal line group provided to cross and be insulated from the gate lines at the outer region of the picture display area, wherein the second gate low voltage line being is connected between the first gate low voltage line and the dummy gate line.

In another aspect of the present invention, the second gate low voltage line may be formed from a source/drain metal layer insulated from the gate lines by a gate insulating film.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 3:
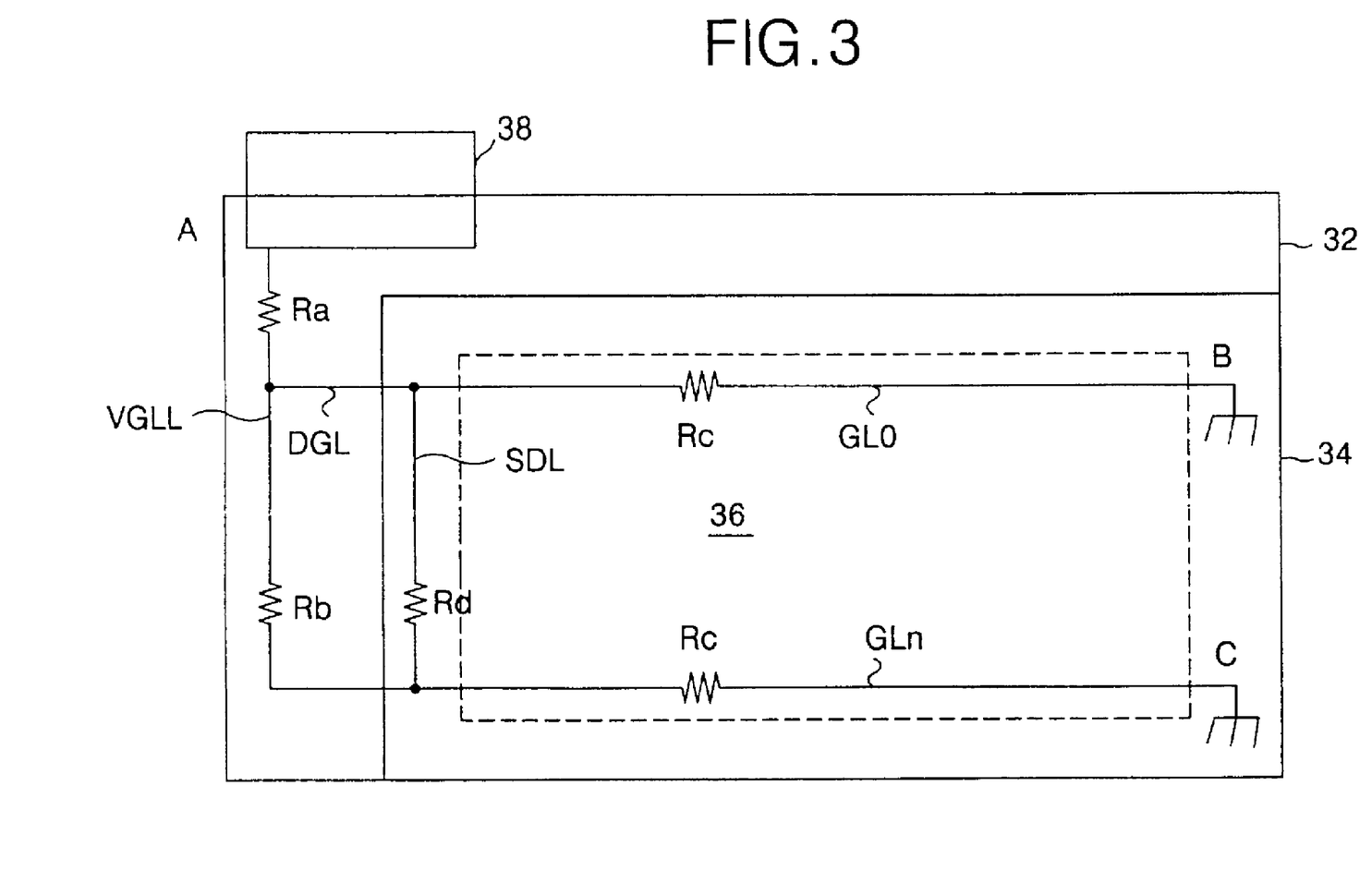
FIG. 3 illustrates a gate low voltage transmission line of a line-on-glass type liquid crystal display according to one aspect of the present invention.

FIG. 3 illustrates a gate low voltage transmission line of a line-on-glass (LOG) type liquid crystal display according to one aspect of the present invention.

Referring to FIG. 3, a liquid crystal display panel may, for example, include a lower substrate 32 supporting signal lines and a thin film transistor array, an upper substrate 34 supporting a color filter array, and liquid crystal material (not shown) between the lower and upper substrates 32 and 34. The liquid crystal display panel may further be provided with a picture display area 36 capable of displaying a picture and having a plurality of liquid crystal cells arranged at crossings of a plurality of gate lines GL0 to GLn and a plurality of data lines (not shown). At an outer region of the lower substrate 32, outside the picture display area 36, data pads and gate pads (not shown) may be connected to end portions of the data lines and gate lines GL0 to GLn, respectively. Further, a LOG signal line group may be arranged at the outer region of the lower substrate 32 for transmitting gate driving signals to a gate driver IC (not shown).

The LOG-type signal line group may transmit direct current voltage signals (e.g., gate high voltage (Vgh), gate low voltage (Vgl), common voltage (Vcom), ground voltage (GND), supply voltage (VCC) signals, etc.) generated by a power supply (not shown) and also transmit gate control signals (e.g., gate start pulse (GSP), gate shift clock (GSC), gate enable (GOE) signals, etc.) generated by a timing controller (not shown). In one aspect of the present invention, the LOG signal line group may be formed from a same material used in forming the gate lines GL0 to GLn (e.g., a gate metal).

A data driver IC (not shown) may be mounted on data TCP 38 connected to the data pads formed on the lower substrate 32. The data driver IC may convert digital pixel data signals into analog pixel voltage signals and apply the analog pixel voltage signals to the data lines arranged on the liquid crystal display panel. In one aspect of the present invention, a first data TCP 38 may further include a gate driving signal transmission line group connected to the LOG signal line group. The gate driving signal transmission line group may transmit gate driving signals from the timing controller and the power supply to the LOG-type signal line group via a data PCB (not shown).

Similarly, a plurality of gate driver ICs (not shown) may be mounted on a plurality of gate TCP (not shown) connected to gate pads formed on the lower substrate 32. In one aspect of the present invention, the gate TCPs may further include a gate driving signal transmission line group connected between the LOG signal line group and the gate driver ICs. The gate driver ICs may sequentially apply gate high voltage signals (Vgh) to the gate lines in response to inputted control signals. Further, the gate driver ICs may apply gate low voltage signals (Vgl) to the gate lines during a time period when the gate high voltage signal (Vgh) is not applied to the gate lines.

According to the principles of the present invention, a gate low voltage signal (Vgl) transmission path formed on the lower substrate 32 may be equivalently expressed as including an A-B transmission path and an A-C transmission path. A gate low voltage signal (Vgl) may be applied to a dummy gate line GL0 via the A-B transmission path and a gate low voltage signal (Vgl) may be applied to another gate line (e.g., the nth gate line GLn) via the A-C transmission path.

In one aspect of the present invention, the A-B transmission path may include a first gate low voltage line VGLL, a dummy gate line GL0, a second gate low voltage line SDL connected between the first gate low voltage line VGLL and the dummy gate line GL0, and a third gate low voltage line DGL connected between the first gate low voltage line VGLL and the dummy gate line GL0. In another aspect of the present invention, the A-C transmission path may be include the first gate low voltage line VGLL and a gate line other than the dummy gate line (e.g., the nth gate line GLn).

The first gate low voltage line VGLL may extend from the data TCP 38 to a lower end of the lower substrate 32 via the gate TCP (not shown). The second gate low voltage line SDL may extend from the lower end of the lower substrate 32 to the dummy gate line GL0 at an upper end of the lower substrate 32. The second gate low voltage line SDL may cross portions of the gate lines arranged within the non-display area, outside the picture display area 36. Accordingly, the second gate low voltage line SDL may be formed from a source/drain metal layer and be insulated from the gate lines via a gate insulating film. In one aspect of the present invention, the third gate low voltage line DGL may connect the dummy gate line GL0 directly to the first gate low voltage line VGLL and connect the first and second gate low voltage lines VGLL and SDL, respectively, in parallel to each other, thereby reducing an intrinsic line resistance of the A-B transmission path.

In one aspect of the present invention, the first gate low voltage line VGLL may have a line resistance, Ra+Rb, which is obtained by adding a first intrinsic line resistance, Ra, specific to the portion of the first gate low voltage line VGLL arranged between the data TCP 38 and a first gate TCP and a second intrinsic line resistance, Rb, specific to the portion of the first gate low voltage line VGLL arranged between the gate TCPs. Similarly, the dummy gate line GL0 and another gate line (e.g., nth gate line GLn) may have a third intrinsic line resistance, Rc, and the second gate low voltage transmission line SDL may have a fourth intrinsic line resistance, Rd.

Figure 4:
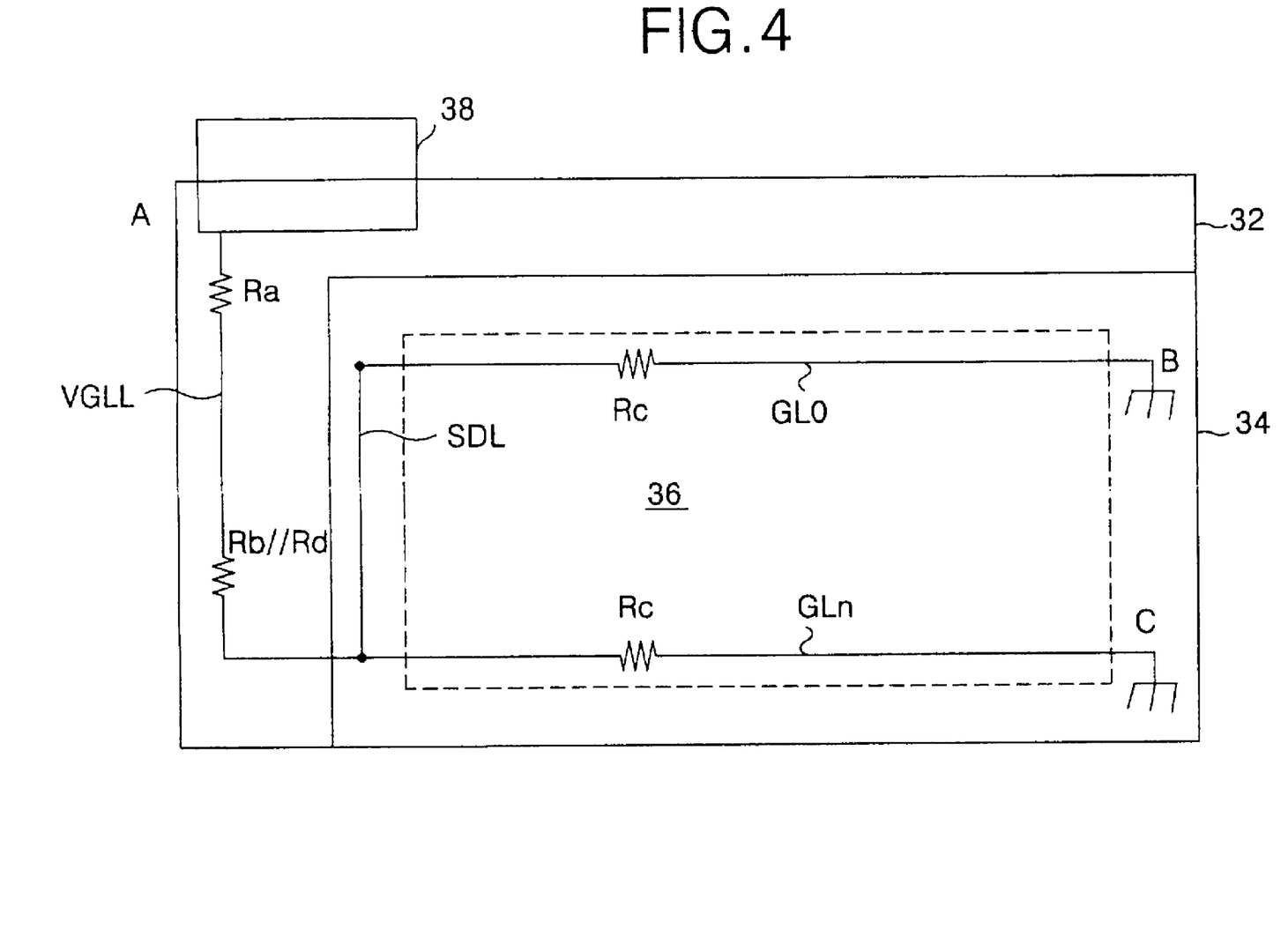
FIG. 4 illustrates an equivalent circuit diagram of the gate low voltage transmission line shown in FIG. 3.

FIG. 4 illustrates an equivalent circuit diagram of the gate low voltage transmission line shown in FIG. 3.

Referring to FIG. 4, a load present at the output terminal of the data TCP 38 is proportional to a total line resistance of the gate low voltage line at the output terminal of the data TCP 38. Accordingly, a total line resistance of the A-B transmission path may be approximately Ra+Rc while a total line resistance of the A-C transmission path may be approximately Ra+(Rb/Rd)+Rc. For example, assuming that Ra≈15Ω, Rb≈45Ω, Rc≈3 kΩ and Rd≈5 kΩ, a total line resistance of the A-B transmission path may be approximately 3.01 kΩ(15Ω+3 kΩ) while a total line resistance of the A-C transmission path may be approximately 3.06 kΩ(15Ω+(45Ω/5 kΩ)+3 kΩ). Accordingly, a difference between a total line resistance of the A-B transmission path and a total line resistance of the A-C transmission path is substantially reduced almost to the point no difference in line resistance exists. Accordingly, a voltage associated with a gate low voltage signal (Vgl) applied to the dummy gate line GL0 may be substantially equal to a voltage associated with the same gate low voltage signal (Vgl) applied to another gate line (e.g., GLn). The effects of the cross-line phenomenon may be minimized such that liquid crystal cells connected to the dummy gate line GL0 may express images at substantially the same brightness as liquid crystal cells connected to the other gate line (e.g., GLn).

According to the principles of the present invention, the first and second gate low voltage lines VGLL and SDL may be connected in parallel to each other such that total line resistance (and thus the load) of the gate low voltage line is minimized. Accordingly, a gate low voltage signal may be stably supplied from the gate low voltage output terminal of the data TCP 38 and uniformly applied to the gate lines within the picture display area 36.

Further, as total line resistance (and thus the total load) at the gate low voltage line is reduced, a load difference between the gate driver ICs may be reduced to minimize differences in an applied gate low voltage signal. Accordingly, the effects of the cross-line phenomenon may be minimized such that that liquid crystal cells connected to the dummy gate line GL0 may express images at substantially the same brightness as liquid crystal cells connected to another gate line (e.g., GLn).

Figure 5:
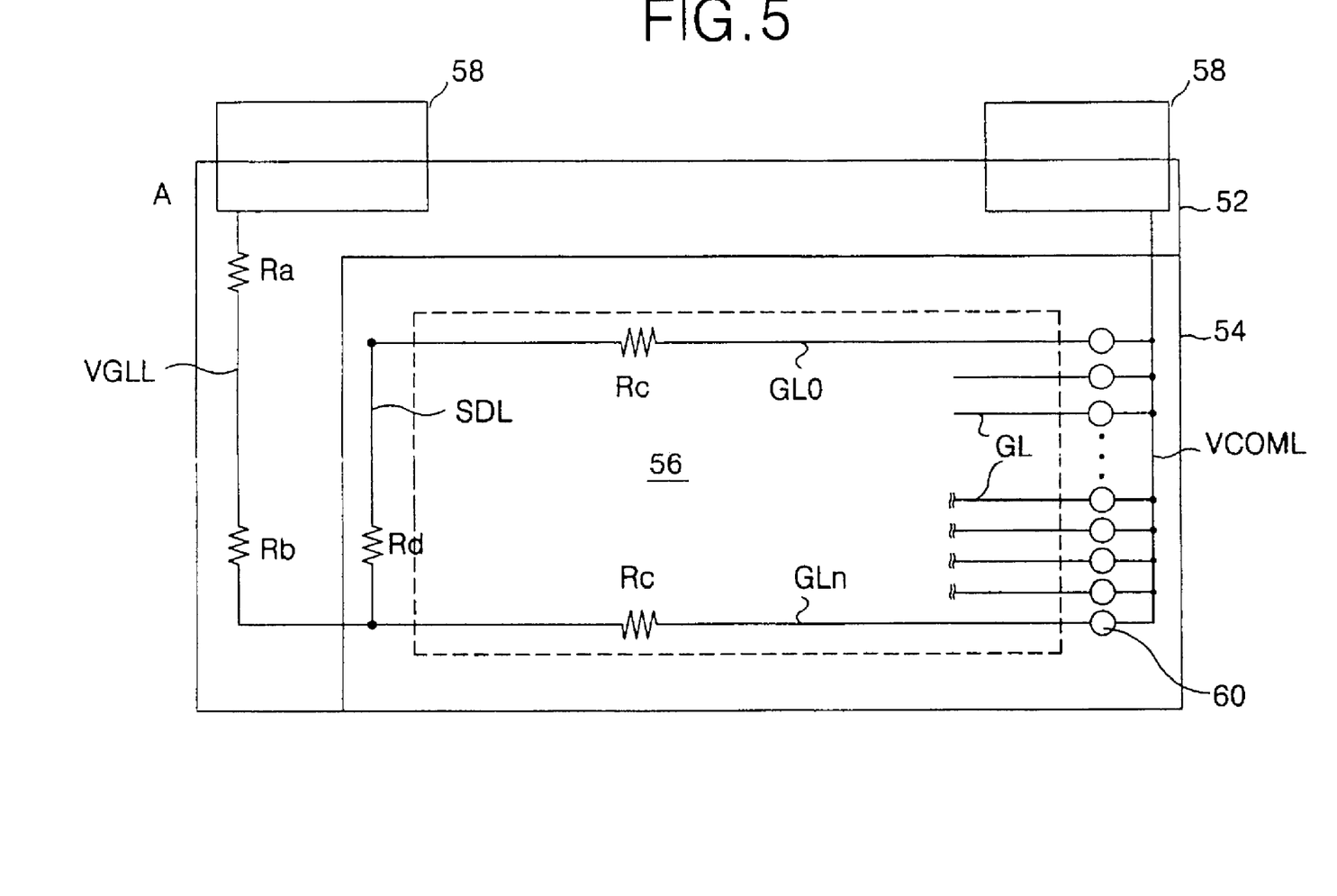
FIG. 5 illustrates a gate low voltage transmission line of a line-on-glass type liquid crystal display according to another aspect of the present invention.

Referring to FIG. 5, there is shown a configuration of a gate low voltage transmission line in a LOG-type liquid crystal display device according to an embodiment of the present invention.

FIG. 5 illustrates a gate low voltage transmission line of a line-on-glass type crystal display according to another aspect of the present invention.

Referring to FIG. 5, a liquid crystal display panel may, for example, include a lower substrate 52 supporting signal lines and a thin film transistor array, an upper substrate 54 supporting a color filter array, and liquid crystal material (not shown) between the lower and upper substrates 52 and 54. The liquid crystal display panel may further be provided with a picture display area 56 capable of displaying a picture and having a plurality of liquid crystal cells provided at crossings of a plurality of gate lines GL0 to GLn and a plurality of data lines (not shown). Arranged at an outer region of the lower substrate 52 outside the picture display area 56, a LOG signal line group may transmit gate driving signals to a gate driver IC (not shown).

The LOG-type signal line group may transmit direct current voltage signals (e.g., gate high voltage (Vgh), gate low voltage (Vgl), common voltage (Vcom), ground voltage (GND), supply voltage (VCC) signals, etc.) generated by a power supply (not shown) and also transmit gate control signals (e.g., gate start pulse (GSP), gate shift clock (GSC), gate enable (GOE) signals, etc.) generated by a timing controller (not shown). In one aspect of the present invention, the LOG signal line group may be formed from a same material used in forming the gate lines GL0 to GLn (e.g., a gate metal).

A data driver IC (not shown) may be mounted on data TCP 58 connected to the data pads formed on the lower substrate 52. The data driver IC may convert digital pixel data signals into analog pixel voltage signals and apply the analog pixel voltage signals to the data lines arranged on the liquid crystal display panel. In one aspect of the present invention, a first data TCP 58 may further include a gate driving signal transmission line group connected to the LOG signal line group. The gate driving signal transmission line group may transmit gate driving signals from the timing controller and the power supply to the LOG signal line group via the data PCB.

Similarly, a plurality of gate driver ICs (not shown) may be mounted on a plurality of gate TCP (not shown) connected to gate pads formed on the lower substrate 52. In one aspect of the present invention, the gate TCPs may further include a gate driving signal transmission line group connected between the LOG signal line group and the gate driver ICs. The gate driver ICs may sequentially apply gate high voltage signals (Vgh) to the gate lines in response to inputted control signals. Further, the gate driver ICs may apply gate low voltage signals (Vgl) to the gate lines during a time period when the gate high voltage signal (Vgh) is not applied to the gate lines.

At the lower substrate 52 of the liquid crystal display device having the above-mentioned configuration, a dummy gate line GL0 may be provided as the first scanned line and may include a storage capacitor formed thereon. In the aspect of the present invention, the dummy gate line may receive a gate low voltage signal (Vgl) transmitted from the first data TCP 58 via the first and second gate low voltage lines VGLL and SDL, respectively. In another aspect of the present invention, a gate line other than the dummy gate line GL0 (e.g., the nth gate line GLn) may receive a gate low voltage signal (Vgl) from the first data TCP 58 via the first gate low voltage line VGLL and a gate driver IC (not shown). All of the gate lines GL within the liquid crystal display panel, including the nth gate line GLn, may be connected to a common voltage line VCOML via a static electricity prevention circuit 60 arranged at a side of the liquid crystal display panel opposite the side on which gate driver ICs are formed. A common voltage signal (Vcom) may be applied to the common voltage line VCOML via a last data TCP 58.

According to the principles of the present invention, the static electricity prevention circuit 60 may include a plurality of thin film transistors capable of preventing externally generated static electricity from interfering with the signals generated by the liquid crystal display panel. The dummy gate line GL0 may be connected to the common voltage line VCOML as the other gate lines GL are connected to the common voltage line VCOML, via the static electricity prevention circuit 60. Accordingly, the dummy gate line GL0 may be connected in parallel to other gate lines GL, thereby minimizing a line resistance between the between the dummy gate line GL0 and other gate lines GL. Accordingly, a load of the entire gate low voltage signal (Vgl) may be minimized so that a voltage difference between the dummy gate line GL0 and other gate lines GL is also minimized. As a result, the effects of the cross-line phenomenon may be minimized such that that liquid crystal cells connected to the dummy gate line GL0 may express images at substantially the same brightness as liquid crystal cells connected to other gate lines GL. Accordingly, a gate low voltage signal may be stably supplied from the gate low voltage output terminal of the data TCP 58 and uniformly applied to the gate lines within the picture display area 56.

In accordance with the principles of the present invention, as total line resistance (and thus the total load) at the gate low voltage line is reduced, a load difference between the gate driver ICs may be reduced to minimize differences in an applied gate low voltage signal. Accordingly, the effects of the cross-line phenomenon may be minimized such that that liquid crystal cells connected to the dummy gate line may express images at substantially the same brightness as liquid crystal cells connected to other gate lines.

According to principles of the present invention, a line resistance of the gate low voltage line may be minimized by reducing a length of the transmission path used in applying a gate low voltage signal to the dummy gate line minimized or by providing the dummy gate line to have substantially the same potential as other gate lines via the static electricity prevention circuit. Accordingly, a difference in gate low voltage signals applied to the dummy gate line and other gate lines within the liquid crystal display panel may be minimized such that the effects of the cross-line phenomenon prevented from being induced. Furthermore, total load of the gate low voltage transmission line may be reduced so that a stable gate low voltage signal may be applied to the gate lines, thereby preventing deterioration in picture quality caused by unstable gate low voltage signals.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a plurality of gate lines being driven by a gate driving circuit;
a dummy gate line receiving only a gate low voltage;
a liquid crystal display panel, the liquid crystal display panel comprising a non-display area;
a signal terminal receiving the gate low voltage;
a first signal line arranged in the non-display area, the first signal line connected to the signal terminal for supplying the gate low voltage;
a second signal line arranged in the non-display area, the second signal line connected between the dummy gate line and the first signal line for supplying the gate low voltage, and
a common voltage line, wherein the plurality of gate lines are connected to the first signal line and the common voltage line via a plurality of static electricity prevention circuits, and the dummy gate line being connected to the common voltage line via the static electricity prevention circuit is connected to the gate lines in parallel to minimize a gate low voltage difference between the dummy gate line and the gate lines.

2. The liquid crystal display device according to claim 1, wherein the first signal line comprises a line-on-glass signal line.

3. The liquid crystal display device according to claim 1, wherein the second signal line comprises a line-on-glass signal line.

4. The liquid crystal display device according to claim 1, wherein each of the plurality of static electricity prevention circuits comprises a thin film transistor.

5. A liquid crystal display device, comprising:
a plurality of gate lines being driven by a gate driving circuit;
a dummy gate line receiving only a gate low voltage;
a liquid crystal display panel, the liquid crystal display panel comprising a display area;
a tape carrier package;
a first signal line outside the display area and connected to the tape carrier package for supplying the gate low voltage;
a second signal line outside the display area and connected to the dummy gate line and the first signal line for supplying the gate low voltage;
a common voltage supply line supplying a common voltage; and
a plurality of static electricity prevention circuits connected directly to the plurality of gate lines and the common voltage supply line, and the dummy gate line being connected to the common voltage line via the static electricity prevention circuit is connected to the gate lines in parallel to minimize a gate low voltage difference between the dummy gate line and the gate lines.

6. The liquid crystal display device according to claim 5, wherein the first signal line comprises a line-on-glass signal line.

7. The liquid crystal display device according to claim 5, wherein the second signal line comprises a line-on-glass signal line.

8. The liquid crystal display device according to claim 5, wherein each of the plurality of static electricity prevention circuits comprises a thin film transistor.

* * * * *